United States Patent
Masterman (10) Patent No.: US 9,351,110 B2
(45) Date of Patent: *May 24, 2016

(54) MOBILE NOTIFICATIONS BASED UPON LOCATION

(71) Applicant: Amazon Technologies, Inc., Seattle, WA (US)

(72) Inventor: Michael F. Masterman, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/576,746

(22) Filed: Dec. 19, 2014

(65) Prior Publication Data

US 2015/0105106 A1 Apr. 16, 2015

Related U.S. Application Data

(63) Continuation of application No. 13/596,119, filed on Aug. 28, 2012, now Pat. No. 8,923,824.

(51) Int. Cl.
*H04W 68/00* (2009.01)
*H04W 4/02* (2009.01)

(52) U.S. Cl.
CPC ............ *H04W 4/02* (2013.01); *H04W 68/00* (2013.01)

(58) Field of Classification Search
CPC .................................................. H04W 68/00
USPC ..................................................... 455/456.3
See application file for complete search history.

(56) References Cited

U.S. PATENT DOCUMENTS

| | | | |
|---|---|---|---|
| 6,271,764 B1 | 8/2001 | Okamura | |
| 6,408,187 B1 | 6/2002 | Merriam | |
| 7,469,155 B2 | 12/2008 | Chu | |
| 8,774,825 B2* | 7/2014 | Forstall et al. | 455/456.1 |
| 8,781,500 B1 | 7/2014 | Dekel | |
| 2003/0054866 A1 | 3/2003 | Byers et al. | |
| 2004/0203673 A1 | 10/2004 | Seligmann | |
| 2005/0054290 A1 | 3/2005 | Logan et al. | |
| 2005/0136903 A1 | 6/2005 | Kashima et al. | |
| 2006/0003752 A1 | 1/2006 | Rivera-Cintron et al. | |
| 2006/0019638 A1* | 1/2006 | Chiu et al. | 455/412.2 |
| 2006/0025159 A1 | 2/2006 | Estevez et al. | |
| 2006/0116142 A1* | 6/2006 | Cofta | 455/466 |
| 2006/0135139 A1 | 6/2006 | Cheng et al. | |
| 2006/0153358 A1 | 7/2006 | Zernovizky et al. | |
| 2007/0032225 A1* | 2/2007 | Konicek et al. | 455/417 |
| 2007/0037605 A1 | 2/2007 | Logan | |
| 2007/0037610 A1 | 2/2007 | Logan | |

(Continued)

OTHER PUBLICATIONS

U.S. Appl. No. 13/474,047, filed May 17, 2012 and entitled "Discovery of Public Points of Interest".

(Continued)

*Primary Examiner* — Nathan Mitchell
(74) *Attorney, Agent, or Firm* — Thomas | Horstemeyer, LLP (57) ABSTRACT

Disclosed are various embodiments employed to generate device notifications based upon location data associated with a mobile device. To this end, a request to generate a device notification is obtained from a user application. Notification content is extracted from the request and an escalated or de-escalated notification level is applied that is based at least in part upon the location of the mobile device and properties about the location that can be identified.

17 Claims, 5 Drawing Sheets

(56) References Cited

U.S. PATENT DOCUMENTS

| | | | |
|---|---|---|---|
| 2007/0264974 A1* | 11/2007 | Frank et al. | 455/411 |
| 2008/0032666 A1 | 2/2008 | Hughes et al. | |
| 2008/0170683 A1 | 7/2008 | Zernovizky et al. | |
| 2009/0298511 A1 | 12/2009 | Paulson | |
| 2010/0004000 A1 | 1/2010 | Chen | |
| 2012/0077518 A1 | 3/2012 | Logan | |
| 2012/0276878 A1* | 11/2012 | Othmer et al. | 455/412.2 |
| 2013/0178233 A1 | 7/2013 | McCoy et al. | |
| 2013/0331067 A1* | 12/2013 | Coussemaeker et al. | 455/412.2 |
| 2014/0004886 A1 | 1/2014 | Gillett et al. | |

OTHER PUBLICATIONS

U.S. Appl. No. 13/596,119, filed Aug. 28, 2012 and entitled "Mobile Notifications Based Upon Location".

"Locale—Android Apps on Google Play," retrieved on Apr. 19, 2013, https://play.google.com/store/apps/details?id=com.twofortyfouram.locale&hl=en.

"Locale—Location Based Actions—Mobile Apps 4 Biz," retrieved on Apr. 19, 2013, http://mobileapps4biz.net/2012/06/11/locale-location-based-actions/.

"Set Phone Profiles Based on Location & Automate Tasks & Settings on an . . .," retrieved on Apr. 19, 2013, http://androidadvices.com/set-phone-profiles-based-location-automate-tasks-settings-android/.

* cited by examiner

MOBILE NOTIFICATIONS BASED UPON LOCATION

CROSS-REFERENCE TO RELATED APPLICATIONS

This application is a continuation of and claims the benefit of U.S. patent application Ser. No. 13/596,119, entitled "MOBILE NOTIFICATIONS BASED UPON LOCATION," and filed Aug. 28, 2012, which is hereby incorporated by reference in its entirety.

BACKGROUND

Current mobile devices provide for an ability to display notifications that are related to received email, short message service (SMS) messages, mobile application notifications, and other types of content that is pushed to the mobile device and/or pulled by the mobile device and subsequently displayed via some type of notification capability provided by the mobile device operating system. Current mobile device applications and/or operating systems may allow for the ability to filter, categorize and/or prioritize notifications based upon a sender or a message and/or an identity of an application through which a notification originates.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Figure 1:
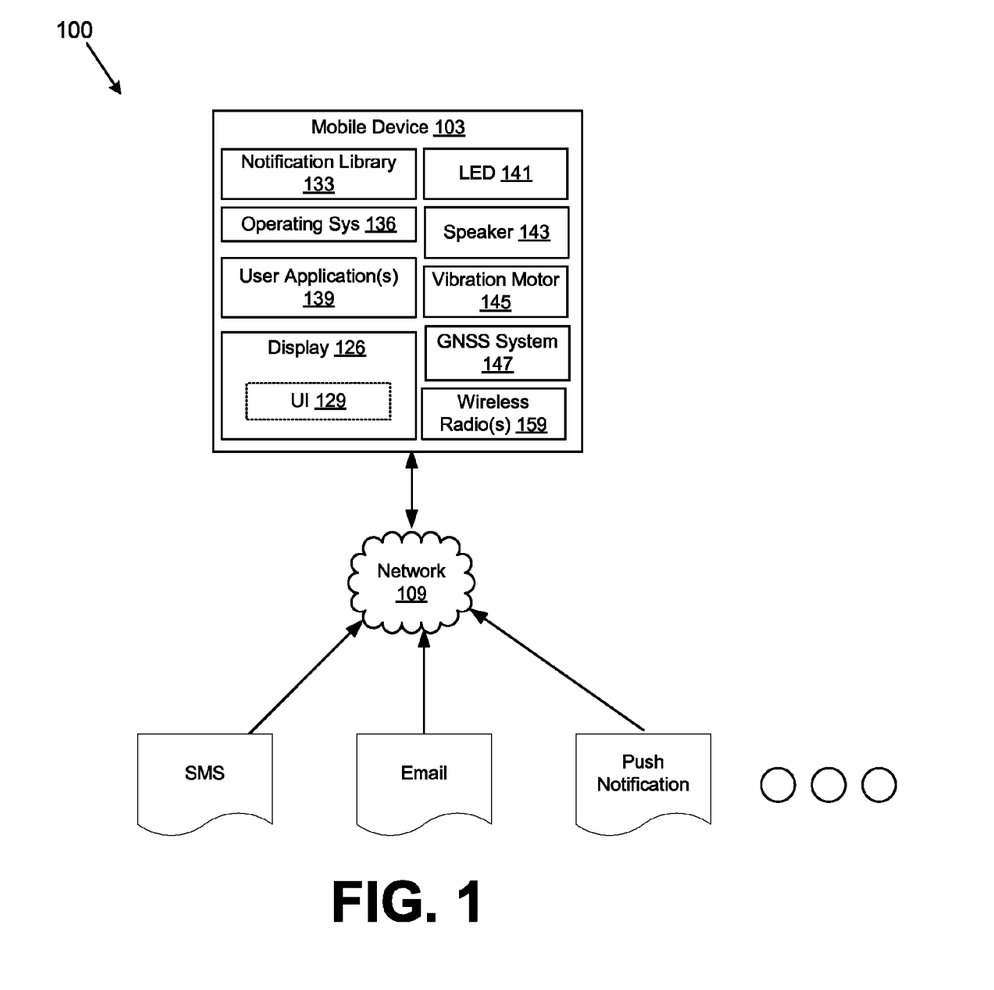
FIG. 1 is a drawing of a networked environment according to an embodiment of the present disclosure.

With reference to FIG. 1, shown is a networked environment 100 that facilitates the use of a mobile device allowing for altering mobile notifications based upon a location of the mobile device as well as input from one or more device sensors and/or data accessible to the mobile device. Specifically, the networked environment 100 includes at least one mobile device 103 in which notifications can be displayed to a user. First, a general description of the physical makeup of the networked environment 100 and its components is described, followed by a discussion of the operation of the same.

To begin, the networked environment 100 includes one or more mobile devices 103 that are coupled to a network 109. The network 109 may comprise, for example, the Internet, intranets, extranets, wide area networks (WANs), local area networks (LANs), wired networks, wireless networks (such as cellular networks), or other suitable networks, etc., or any combination of two or more such networks.

Each of the mobile devices 103 may comprise, for example, a smartphone, tablet computing device, a portable computing system such as, for example, a laptop, or any other device that generally is portable such that an individual may carry such device from place to place as can be appreciated. To this end, according to one embodiment, a mobile device 103 includes a processor circuit having a processor and a memory as can be appreciated.

According to one embodiment, the mobile device 103 includes a display device 126 such as, for example, liquid crystal display (LCD) screens, gas plasma-based flat panel displays, or other types of display devices, etc. The display device 126 included within the mobile device 103 facilitates the display of one or more user interfaces 129 based upon the operation of various applications in the mobile device 103 as will be described. In addition, a mobile device 103 includes various input and output devices such as, for example, a capacitive touchscreen integrated into the display device 126, externally visible lights, light emitting diodes, vibration motors, or other types of visual indicators, an integrated camera, speakers, microphones, and other devices as can be appreciated.

In addition, the mobile device 103 includes various applications and/or systems such as, for example, a notification library 133, an operating system 136, one or more user applications 139, and other applications and/or systems. The notification library 133 is a portion of the operating system 136 and/or an operating system plug-in, application programming interface (API), library, or other type of software component that can facilitate manipulation of device notifications via a user interface, speakers, vibration motors, and/or externally visible indicators such as an externally mounted LED. The operating system 136 is a device operating system that facilitates communication between software components and applications and the mobile device 103 hardware components, such as a processor circuit, input/output bus, input devices, output devices, etc.

User applications 139 represent one or more applications that can be executed by the mobile device 103 and which can obtain various types of data and display notifications in a user interface rendered on the display device or generate other content in the mobile device 103. A user application 139 can comprise an email application, a calendar application, an SMS application, a browser, or any other type of mobile application that can obtain push notifications or generate notifications based upon data obtained via the network 109 or data stored in the mobile device 103. For example, an email or SMS application may generate notifications in the form of an audible ringtone, activation of a vibration motor, a visible notification in a notification bar or other part of an operating system user interface, a flashing or blinking LED or other types of notifications as can be appreciated. In some embodiments, a user application 139 can represent an operating system resource, service, or any type of application that can request to display or activate any type of device notification in the mobile device 103.

As another example, a calendar application may generate notifications associated with appointments or reminders associated with a calendar that are rendered in a user interface shown on the display 126 based upon calendar data stored within the mobile device 103. Additionally, the calendar application may also generate a notification in the form of a ringtone played via a speaker associated with the mobile device 103 or cause an integrated LED to light or blink periodically in one or more different colors. In these and other scenarios where a user application 139 attempts to generate a notification in a mobile device 103, the user applications 139 can do so via an API provided by the notification library 133 by passing a notification data item that contains notification content, meta data (e.g., content type, image capture device type data, location etc.).

The mobile device 103, in one embodiment, further includes various devices sensors and hardware capabilities. For example, the mobile device 103 can include one or more light emitting diodes (LEDs) 141 that can be activated as a part of a notification. The mobile device 103 can also include one or more speakers 143, through which the notification library 133 can play one or more tones or sounds as a part of a notification. Additionally, the mobile device 103 can also include one or more vibration motors 145, which can also be activated by the notification library 133 at various frequencies as a part of a notification.

The mobile device 103 can also include, in some embodiments, a global navigation satellite system 147 that is configured to determine a location of the mobile device 103 by communication with a satellite navigation system, such as the global positioning system (GPS), Globalnaya Navigatsionnaya Sputnikovaya Sistema (GLONASS), or any other satellite navigation system or location detection mechanism. The mobile device 103 can also be configured with one or more wireless radios 159, or wireless network interfaces. For example, the mobile device 103 can include a Bluetooth communication subsystem, a wireless networking subsystem such as a wireless local area networking system (e.g., Wi-Fi) facilitating communication with a wireless local area network and/or a wireless wide area networking system facilitating communication with a wireless wide area network.

Location data associated with the mobile device 103 can be requested by the notification library 133 from an operating system executed by the mobile device 103, which can provide location data that is derived from data obtained from the GNSS system 147, the wireless radios 159, or any other systems as can be appreciated.

Accordingly, the notification library 133 can determine, based upon the location of the mobile device, whether a notification rule specifying a particular notification level is associated with the location of the mobile device and potentially other device sensor data. The notification library 133 can also determine, absent an applicable notification rule, whether the notification level corresponding to a particular notification should be modified based upon the location of the mobile device 103 and/or device sensor data.

The notification level can comprise one of many various levels of notification depending upon the location associated with the mobile device 103. For example, the notification levels associated with the notification library 133 can be ranked according to a degree or amount of device notifications associated with the notification level. In this sense, an escalated notification level can comprise any combination of user interface elements displayed by the notification library 133 in an operating system user interface, audible or tactile notification, and/or LED notifications. Conversely, lower priority notifications can be associated with a de-escalated notification level, which can comprise, for example, a less intrusive form of notification generated by the notification library 133. For example, a de-escalated notification level may be characterized by fewer visual notification elements, less intrusive audible notifications, etc. In some embodiments, a de-escalated notification level can comprise delaying certain device notifications until a later point in time. For example, if the mobile device 103 is detected to be in a certain location, the notification library 133 can delay activation of device notifications until the mobile device 103 is a certain distance away from the location. The notification levels can also include a default notification level with which a location cannot be associated with an escalated or de-escalated notification level can be associated.

As another example, the notification library 133 can determine whether the mobile device 103 is entering and/or approaching a location that is associated with an escalated or de-escalated notification level and escalate and/or de-escalate previous notifications already processed by the notification library 133 based upon the new location. For example, if the mobile device 103 is approaching a location that is associated with an escalated notification level, the notification library 133 can apply an escalated notification level to previous notification items. As an additional example, the notification library 133 can apply a de-escalated notification level to previous notification items if the location is associated with a de-escalated notification level. As one example, the notification library 133 may suppress and/or deactivate or suppress certain notifications already activated in the mobile device 103 consistent with a de-escalated notification level when the mobile device 103 approaches a location associated with a de-escalated notification level.

Other solutions generate varying notification levels depending upon a notification type, a sender, and/or originating application of a notification. In contrast, the notification library 133 can maintain one or more notification rules that relate a location of the mobile device to a notification level. In other words, the notification library 133 can analyze the location in which the mobile device is positioned to determine a corresponding notification level. In one scenario, a user application 139 can submit a request to generate a device notification in the form of a notification user interface element that is a popup element and/or one that is placed in a notification bar in an operating system or launcher user interface by submitting a notification data item containing the notification content to the notification library 133. In response, the notification library 133 can analyze the location of the mobile device 103 as reported by the GNSS system 147, for example, and determine whether a notification rule corresponds to the location and specifies a notification level that varies from the notification requested by the user application 139. The notification library 133 can then generate a notification according to the notification level corresponding to the notification rule.

As noted above, the notification level can specify various types of notifications that are displayed by the operating system 136 in a user interface on the display 126, via visible indicators integrated within the mobile device 103, and/or audible alerts via a speaker integrated within the mobile device 103. For example, a user application 139 that is an email application may request a notification in the form of a ringtone, activation of a vibration motor, activation of a certain LED color and repeat pattern and/or frequency, as well as a notification displayed in a notification bar and/or in a notification popup shown in the operating system 136 user interface 129.

However, the notification library 133 may determine that, based upon the location of the mobile device 103 potentially in combination with other data about ambient conditions as well as a corresponding notification rule, that a different notification level should be employed. Accordingly, if a de-escalated notification level is specified by the notification rule for the location, the notification library 133 can generate a device notification that can vary from the type of notification requested by the user application 139. For example, in the case of an email notification, the notification rule can specify that an audible tone should not be generated nor should the vibration motor be vibrated, while the visible notifications in the user interface 129 and LED should be generated.

The notification rule can specify a notification level that varies from the requested notification in various ways and in various permutations, such as in the form of various volumes or selections of ringtones, a repeat frequency or repeat pattern of a ringtone, vibration motor activation, and/or LED activation, the intensity of the LED activation, and in other combination and permutations as can be appreciated. For example, the notification rule can specify a particular volume of a ringtone that varies from a default volume level. As another example, the notification rule can specify a pattern with which the vibration motor is activated that varies relative to the default pattern. As yet another example, the notification rule can specify a frequency with which the LED is activated that varies from the default frequency. Additionally, the notification rule can specify varying levels of display brightness that can be employed in response to certain ambient conditions.

In some embodiments, a notification rule maintained by the notification library 133 can specify one or more device notifications associated with some characteristic of the location of the mobile device 103 and/or other device sensor data that vary from the default notifications that correspond to those requested by the user application 139. For example, an email application may ordinarily request from the notification library a particular combination of default device notifications. Accordingly, a notification rule can specify certain device notifications that are employed in addition to the default notifications. For example, an email application may request to generate device notifications that include the playing of a ringtone, activation of an LED and vibration motor and/or the display of a user interface element. Accordingly, a notification rule can specify that the volume of a default ringtone should be elevated, the frequency with which the LED and/or vibration motor are repeated to be modified, or specify other changes to a default device notifications.

In one embodiment, a user of a mobile device 103 may set up various notification rules via a user interface provided by the notification library 133 on the mobile device and/or via a web based user interface. The notification rules can specify a notification level that includes a combination of device notifications that are associated with a particular location, type of location, or device sensor data. In one embodiment, a notification rule can specify that when the location of the mobile device 103 is within a predetermined radius of a specific location, address and/or point of interest that notifications received while the device is within the predetermined radius should be escalated or de-escalated. For example, if the mobile device 103 is located within a predetermined radius of an office address of a user, notifications can be de-escalated with the mobile device 103 is in such a location. In contrast, if the mobile device 103 is located within a predetermined radius of, for example, a concert venue, a stadium, an arena, or any other location that can be associated with high ambient volume levels, notifications can be escalated.

As another example, the notification library 133 can determine a location type associated with a particular location to determine whether notification levels should be escalated or de-escalated. For example, the notification library 133 can cross reference a location of the mobile device 103 with mapping data to determine the type of location that the mobile device 103 is in or near. The notification library 133 can escalate or de-escalate notification levels based upon the type of location. For example, the notification library 133 can determine that the mobile device 103 is located in an office environment, a library, book store, or other environment that is likely to be a quiet environment and de-escalate incoming notifications. As another example, the notification library 133 can determine that the mobile device 103 is in a retail establishment, venue, or other environment associated with high volume levels, and escalate notifications in such a scenario. To identify a location type, the notification library 133 can query location listings from mapping data that identifies the types and/or identities of residences, places of business, or other types of venues.

Additionally, upon identifying a particular point of interest associated with the location, or a location type (e.g., residence, business, retail, office, movie theater, etc.), the notification library 133 can alter notification levels depending upon the time of day. For example, if the mobile device 103 is located within a movie theater, the notification library 133 can examine movie times associated with the movie theater and identify that the user associated with the mobile device 103 is in the movie theater during a movie showing. Accordingly, a de-escalated notification level can be selected in such a scenario. As another example, the notification library 133 can determine from a listing of events whether an event associated with high volume levels (e.g., concert, sporting events, etc.) is occurring in a venue in which a mobile device 103 is located. In such a scenario, escalated notification levels can be employed. Such a listing of events can be obtained from a source that is accessible to the mobile device 103 via the network 109.

Additionally, the notification library 133 can obtain operating hours associated with a particular location from a listing associated with the location to determine whether the location is likely to comprise a loud or quiet environment during the time in which the mobile device 103 is at the location. If, for example, an incoming notification is received during operating hours of a place of business and the mobile device 103 is located within or near the place of business, the notification library 133 can identify the location type to make a determination as to whether the location is likely to be a quiet environment or a loud environment. The notification library 133 can then escalate or de-escalate notifications if the environment is likely to be loud or quiet, respectively. In some embodiments, a user may specify the operating hours of a place of business or other type of location if the operating hours obtained from the listing are incorrect or cannot be obtained for any other reason, and the notification library 133 can associate the operating hours with the location in order to escalate or de-escalate notifications when the mobile device 103 is located in or near the location.

For example, if the mobile device 103 is located within a library during the operating hours of the library, the notification library 133 can employ de-escalated notification levels. As another example, if the mobile device 103 is located within an amusement park during operating hours, the notification library 133 can employ escalated notification levels. As another example, the notification library 133 can determine based upon a device calendar associated with the mobile device 103 indicates that the user is presently busy or engaged in a meeting. In such a scenario, the notification library 133 can adopt de-escalated notification levels until the user is not busy or engaged in a meeting.

As another example, a notification rule established by a user can specify that when the mobile device 103 is within a certain radius of an address associated with another user to which the user is linked, that an escalated or de-escalated notification level is then applied to an incoming notification. As another example, the notification library 133 can determine whether the mobile device 103 is in a location associated with another user to which the user is linked by examining a contact data store on the mobile device 103. If so, then the notification library 133 can escalate or de-escalate incoming notifications while the mobile device 103 is in such a location. As a variation of this example, the notification library 133 can determine whether the mobile device 103 is in a location associated with another user to whom the user is linked in a social networking system and escalate or de-escalate notifications while the mobile device 103 is in such a location.

As another example, the notification library 133 can also determine whether the location of the mobile device 103 is within the proximity of or a specified radius of another device associated with a user to whom the user is linked in some way. For example, the notification library 133 can determine from a social networking system in which users can provide their locations, or "check-in" to various locations, whether another user to whom a user of the mobile device 133 is linked, is in a location within a specified radius of the mobile device 103. If so, then the notification library 133 can examine the content of a notification, determine whether the notification originates from or is related to the other user, and escalate notifications that are related to the other user. In some embodiments, rather that detecting proximity of a device associated with another user to whom the user of the mobile device 103 is linked in some way, a device associated with the other user that is within a specified distance of the location of the mobile device 103 can broadcast a signal via a wireless radio (e.g., Bluetooth), which can be received by the mobile device 103.

Additionally, the notification library 133 can also determine a relationship between the user and another user associated with the location to which the user is linked. Notifications can then be escalated or de-escalated based upon the location and the relationship. For example, the notification library 133 can escalate or de-escalate notifications when the mobile device 103 is in a location associated with another user to whom the user is related. As another example, the notification library 133 can modify notification levels when the mobile device 103 is in a location associated with another user who is a friend or co-worker of the user. The notification library 133 can determine a relationship between another user and the user associated with the mobile device 103 by examining a published relationship in a social networking system and/or a contact store accessible to the mobile device 103. A contact store can correspond to an address book that is stored on or accessible to the mobile device 103.

As another example, the notification library 133 can also determine an importance of a relationship to a user related to content of a particular notification relative another user to which the mobile device 103 is near. In other words, the notification library 133 can determine whether the mobile device 103 is near another user and subsequently determine whether a notification related to yet another user to which the user of the mobile device 103 is linked is received by the notification library 133. Accordingly, a user can define the relative importance of users with respect to notifications and escalate a notification level when a notification is received that is related to a user that is associated with a higher importance level relative to a user to which the mobile device 103 is near. Conversely, a de-escalated notification level can be applied when a notification is received that is related to a user that is associated with a lower importance level relative to a user to which the mobile device 103 is near.

The notification library 133 can also determine a velocity of the mobile device 103 from data obtained from the GNSS system 147. Accordingly, the notification library 133 can alter notification levels based upon the velocity of the mobile device 103 at any given point in time. If the velocity of the mobile device 103 exceeds a predefined threshold, the notification library 133 can employ escalated notification levels, as an elevated velocity may be consistent with elevated ambient noise levels. Similarly, if the velocity is beneath a threshold or indicates that the mobile device 103 is stationary, the notification library 133 can employ de-escalated notification levels, as such a velocity may be consistent with decreased ambient noise levels. Additionally, a user may specify via a user configured notification rule one or more velocity thresholds and various notification levels with each of the velocity thresholds. Additionally, the notification library 133 can also select escalated notification levels when location data obtained from the GNSS system 147 indicates that the mobile device 103 is located within or near a roadway, airport, or any other similar type of environment that can be associated with elevated noise levels.

The notification library 133 can also generate notification rules by learning what types of notifications are of importance to the user of the mobile device 103. To accomplish this, the notification library 133 can identify a user input in response to a notification that is generated by the notification library 133 and determine whether the user input represents a user interaction or a lack of a user interaction with the notification. If a user interaction with the notification is detected, such as when a user opens a notification or a user application related to the notification, the notification library 133 can generate a notification rule that assigns an escalated notification level to the current location of the mobile device 103. If a lack of a user interaction with the notification is detected, such as when a user dismisses or cancels a notification generated by the notification library 133, then the notification library 133 can generate a notification rule that assigns a de-escalated notification level to the current location of the mobile device 103.

As another example, the notification library 133 can generate notification rules by determining based upon actions within a user application 139 that the user may take. For example, user interaction with the notification is detected, such as when a user opens a notification related to an email message, SMS message, or any other type of message, and the user subsequently deletes the associated message, the notification library can assign a de-escalated notification level to the location of the mobile device 103. Additionally, in this scenario, the notification library 133 can also detect whether the user reads, replies to, or otherwise interacts with the message and assign an escalated notification level to the location of the mobile device 103.

Figure 2:
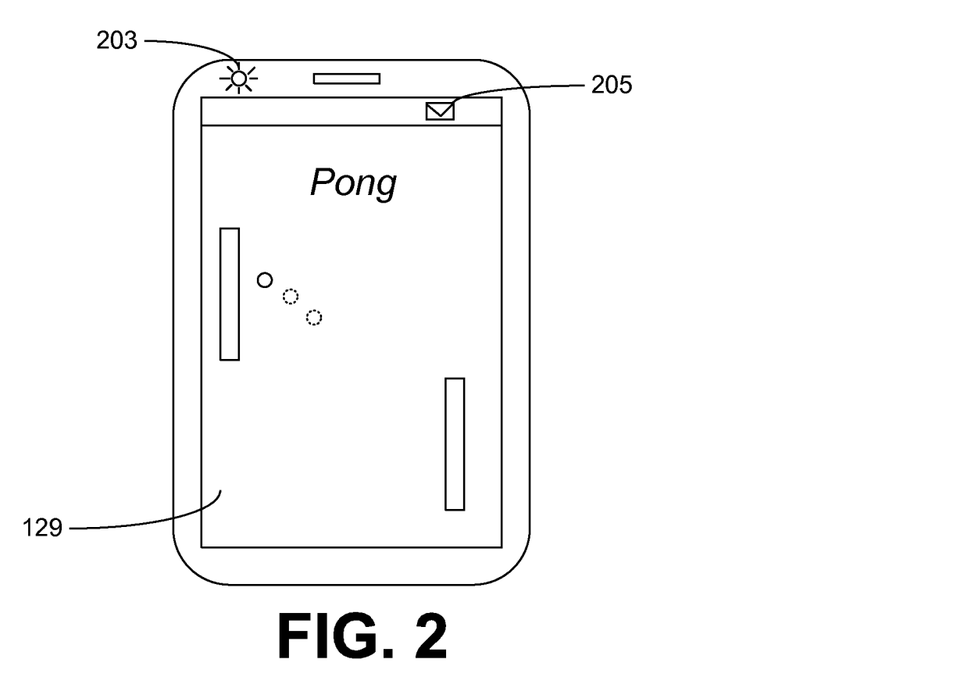
FIGS. 2-4 are drawings of example user interfaces generated in a mobile device according to an embodiment of the present disclosure.

Referring next to FIG. 2, shown is an example of a mobile device 103 displaying a user interface 129 in which various types of notifications can be generated by the notification library 133. In the example of FIG. 2, also shown is an example of an externally visible LED 203 that can be activated by the notification library 133 in response to a request to generate a notification from a user application 139. In the depicted example, a user application 139, such as an email application has requested to generate a notification in the mobile device 103. Accordingly, in the scenario shown in FIG. 2, the user application 139 has requested that the notification include periodic activation of the LED 203 as well as display of a notification badge 205 in a notification area of the user interface 129 and potentially playing of a ringtone associated with the email application. Therefore, in this scenario, the notification library 133 can generate the requested notifications. For example, in this scenario, there may be no predefined notification rules corresponding to the location of the device. Therefore, if there are no predefined notification rules corresponding to the location, the notification library 133 can generate notification according to a default behavior, which can include generating the notifications requested by the user application 139.

Figure 3:
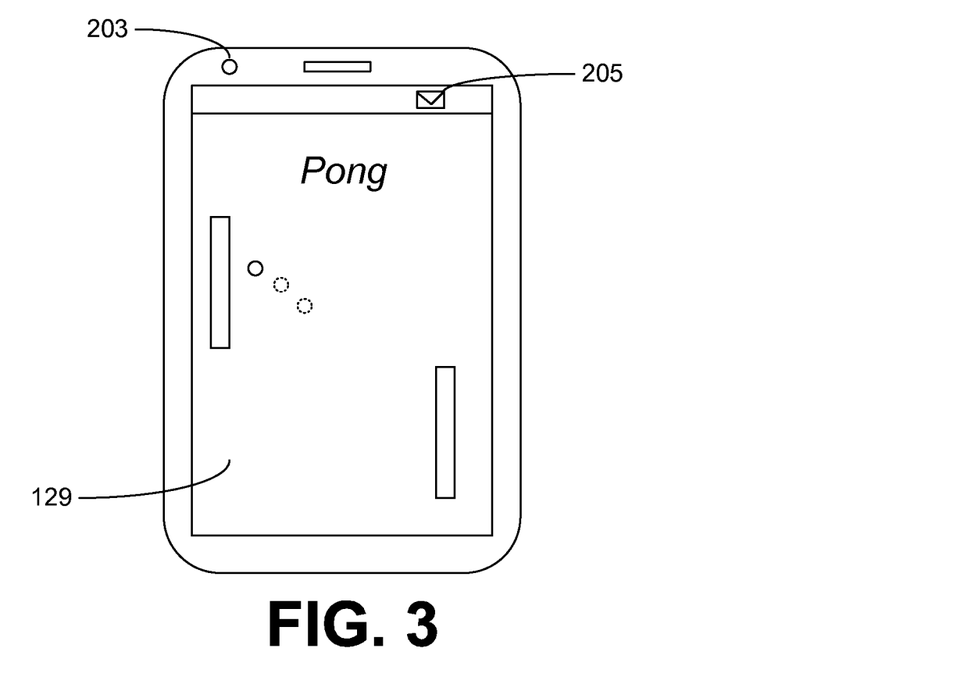

Referring next to FIG. 3, shown is an alternative example of a mobile device 103 and user interface 129 in which the notification library 133 has generated a device notification corresponding to a notification rule. In the depicted example, a notification rule specifying a de-escalated notification level is identified that applies to the current location of the mobile device 103. Accordingly, the notification rule can specify that the notification library 133 generates device notifications that vary from those requested by the user application 139. In this example, the notification library 133 can display the notification badge 205 but can also suppress activation of the LED 203 as well as potentially suppress playing of a ringtone.

Figure 4:
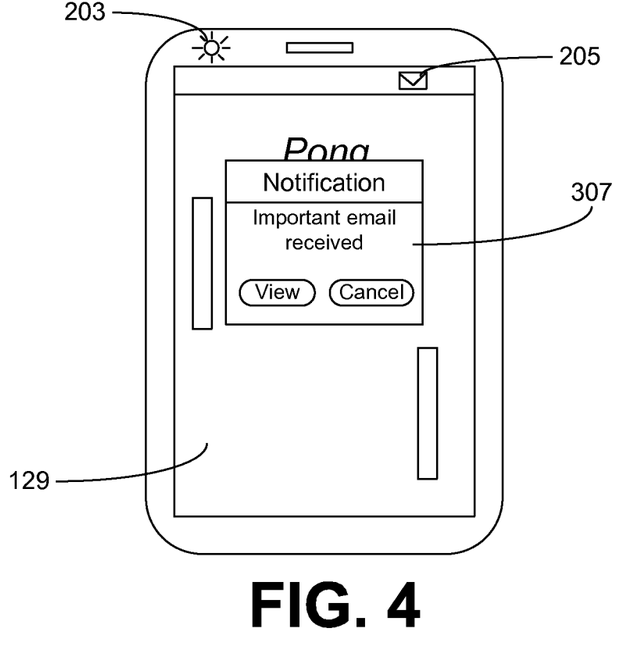

Referring next to FIG. 4, shown is an alternative example of a mobile device 103 and user interface 129 in which the notification library 133 has generated a device notification corresponding to a notification rule. In the depicted example, a notification rule specifying an escalated notification level is identified that applies to the location of the mobile device 103. Accordingly, the notification rule can specify that the notification library 133 generates device notifications associated with an escalated notification level. In one embodiment, the escalated notification level includes additional or alternative device notifications that can signal importance of the notification to the user of the mobile device 103. The escalated notification level can include device notifications that vary from those requested by the user application 139.

In this example, the notification library 133 can display the notification badge 205 and activate the LED 203, which may be the device notifications requested by the user application 139. The notification library 133, in order to effectuate an escalated notification level, can also display a popup notification 307 in the user interface 129 that includes user interface elements with which the user may interact. In this example, the popup notification 307 allows the user to dismiss the notification or view additional information related to the notification (e.g., the email message). The notification library 133 can also periodically activate a vibration motor associated with the mobile device until the user interacts with popup notification 307 even though such a notification may not have been requested by the user application 139.

Additionally, the notification library 133 can also refine and/or define notification rules that are related to the location of the mobile device 103 based upon user interaction with the popup notification 307. In the depicted example, the notification library 133 can detect user input that corresponds to user interaction with the notification, such as activation of the "View" button. The notification library 133 can also detect user input that corresponds to a lack of user interaction with the notification, such as activation of the "Cancel" button. In the case of detection of user interaction with the notification, the notification library 133 can confirm a notification rule associated with the location as well as other device sensor data associated with ambient conditions. The notification library 133 can also adjust the notification rule applying to the location to an even more escalated notification level. In the case of detection of a lack of user interaction with the notification, the notification library 133 can adjust the notification rule associated with the location so that a de-escalated notification level is applied.

Figure 5:
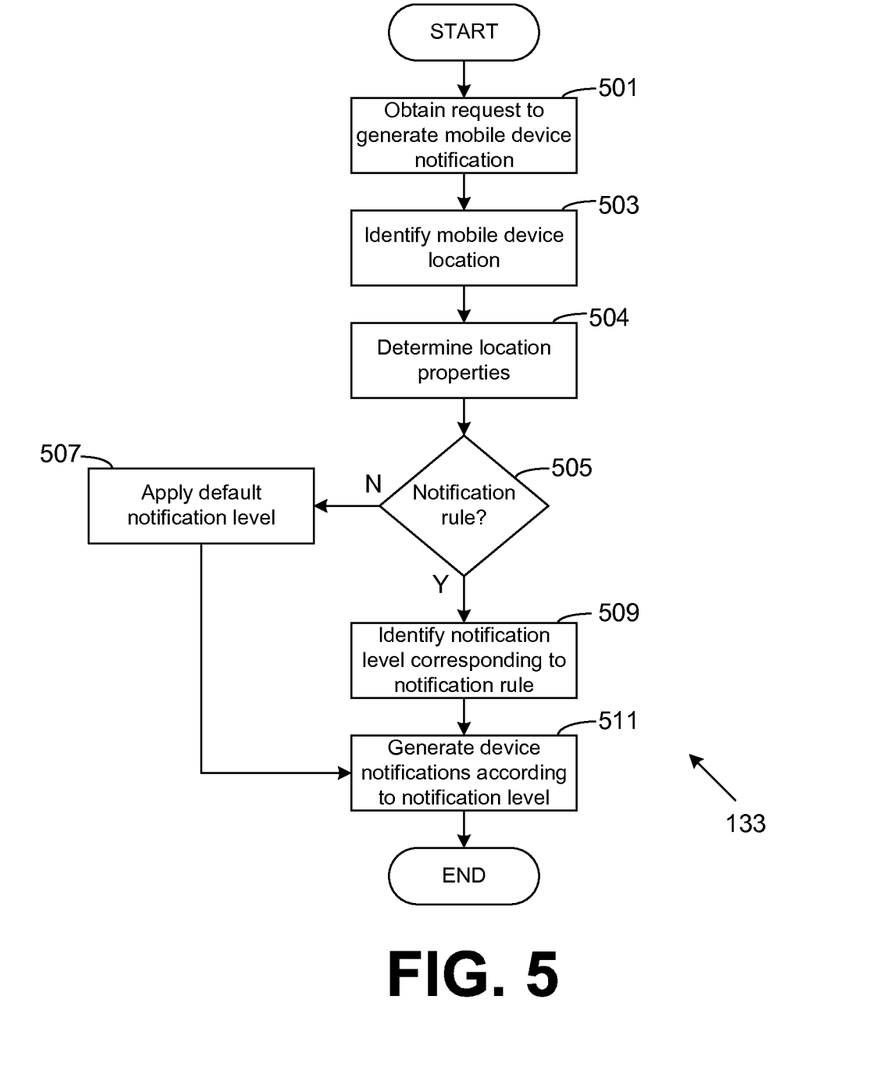
FIG. 5 is a flowchart that illustrates one example of a portion of the operation of the notification library in a mobile device according to an embodiment of the present disclosure.

Referring next to FIG. 5, shown is a flowchart that provides one example of the operation of at least a portion of the notification library 133 according to an embodiment of the present disclosure. Alternatively, the flowchart of FIG. 5 may be viewed as depicting steps of an example of a method implemented in a mobile device 103 (FIG. 1).

Beginning with box 501, the notification library 133 obtains a request from a user application 139 executed by the mobile device 103 to generate one or more device notifications. The request can include a notification data item that includes notification content that is related to the notification or that the user application 139 is attempting to place in a visual notification user interface element. The notification data item also includes the requested types of notification, such as whether to place a notification badge in a user interface, a popup element, LED activation, vibration motor activation, and/or playing of audible alerts or ringtones. As noted above, a user application 139 can include any application executed by the mobile device 103 that initiates notifications in the mobile device 103 that are related to communications (e.g., email, SMS, mobile application push notifications, etc.) obtain on behalf of a user as well as applications that generate notifications related to any other type of content (e.g., calendar applications, games, electronic commerce applications, etc.).

The notification library 133 can then determine a location of the mobile device 103 in box 503. As noted above, the notification library 133 can request the location of the mobile device 103 from an operating system executed by the mobile device 103, which can obtain location data of the mobile device 103 from the GNSS system 147 and/or the wireless radios 159. Additionally, in box 504, the notification library 133 can determine whether a location type and/or point of interest can be associated with the location. In other words, the notification library 133 can identify a location listing associated with the location of the mobile device 103. In some embodiments, the notification library 133 can determine a location type associated with the location and/or a point of interest associated with the location.

The notification library 133 can also determine whether an event is occurring at the location that can be associated with elevated volume levels, such as a concert or sporting event. The notification library 133 can also determine whether an event is occurring at the location that can be associated with lowered volume levels. The notification library 133 can also determine whether the location is associated with another user to which the user of the mobile device 103 is linked. For example, the notification library 133 can examine an address book on the mobile device 103 to determine whether the location is associated with a user in the address book. As another example, the notification library 133 can determine whether the location is associated with another user in a social networking system to which the user is linked. Additionally, the notification library 133 can also attempt to determine a published relationship between the other user and the user of the mobile device 103.

In box 505, the notification library determines whether a notification rule is defined that applies to the location and/or properties associated with the location. As noted above, in one embodiment, the notification library 133 can determine, based upon a location type whether the location is associated with elevated volume levels. In such a scenario, the notification library can employ an escalated notification level. Alternatively, the notification library 133 may also determine, based upon the location type, whether the location is associated with lowered volume levels relative to a baseline volume level. In such a scenario, the notification library can employ de-escalated notification levels.

In box 507, the notification library 133 can apply a default notification level if a notification rule is not defined that applies to the location and/or location properties. In one embodiment, the default notification level can include generating the notifications requested by the user application 139, taking into account whether the mobile device 103 is in a quiet mode, silent mode, loud mode, or other type of operating system setting that affects the type and/or degree of device notifications desired by the user. In box 509, if a notification rule is identified that corresponds to the location and/or location properties, the notification library can then identify a notification level that corresponds to the notification rule. The notification level specified by the notification rule can define various types of device notifications that should be applied. Finally, in box 511, the notification library 133 can cause the device notification specified by the notification level applied to be generated in the mobile device 103.

Figure 6:
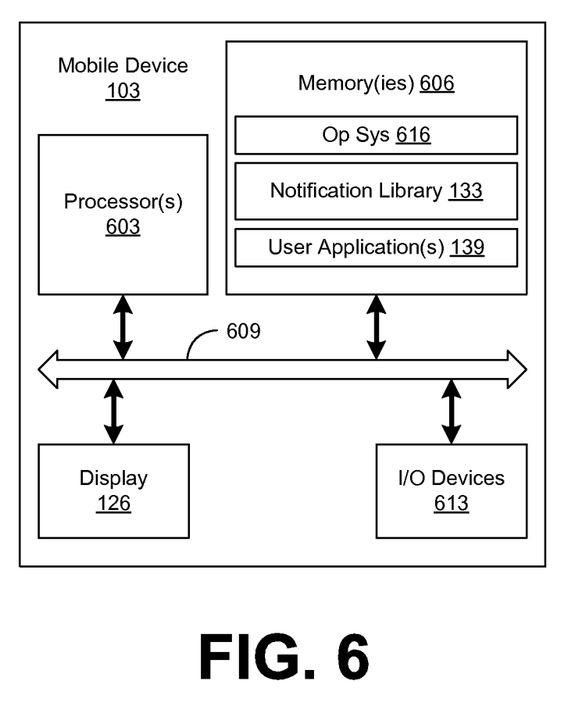
FIG. 6 is a schematic block diagram that depicts one example of a mobile device in the networked environment of FIG. 1 according to an embodiment of the present disclosure.

Referring next to FIG. 6, shown is a schematic block diagram of one example of a mobile device 103 according to an embodiment of the present disclosure. The mobile device 103 includes a processor circuit, for example, having a processor 603 and a memory 606, both of which are coupled to a local interface 609. To this end, the mobile device 103 may comprise, for example, a portable device such as laptop, personal digital assistant, cellular telephone, or other device. The local interface 609 may comprise, for example, a data bus with an accompanying address/control bus or other bus structure as can be appreciated. The mobile device 103 includes the display 126 coupled to the local interface 609 to allow the processor 603 to apply visual data to the display 126. In some embodiments, the mobile device 103 can include other elements that are coupled to the local interface 609, such as a location system configured to obtain location or position data associated with the mobile device 103, and other systems as can be appreciated. In addition, the mobile device 103 includes various input/output devices 613 such as a capacitive touchscreen, toggles, push buttons, microphones, speakers 143, vibration motors 145, LEDs 141, GNSS system 147, wireless radios 159, other types of wired and/or wireless network interfaces, and other devices that are coupled to the local interface 609.

Stored in the memory 606 are several components that are executable by the processor 603. In particular, stored in the memory 606 are an operating system 616, the notification library 133, one or more user applications 139, and other systems and applications. Also, various data may be stored, for example, in the memory 606, or some other memory accessible to the mobile device 103. It is understood that there may be other applications that are stored in the memory 606 and are executable by the processor 603 as can be appreciated. Where any component discussed herein is implemented in the form of software, any one of a number of programming languages such as, for example, C, C++, Java, Java Script, Perl, Python, Flash, or other programming languages.

A number of software components are stored in the memory 606 and are executable by the processor 603. In this respect, the term "executable" means a program file that is in a form that can ultimately be run by the processor 603. Examples of executable programs may be, for example, a compiled program that can be translated into machine code in a format that can be loaded into a random access portion of the memory 606 and run by a respective processor 603, source code that may be expressed in proper format such as object code that is capable of being loaded into a random access portion of the memory 606 and executed by a processor 603, or source code that may be interpreted by another executable program to generate instructions in a random access portion of the memory 606 to be executed by a processor 603, etc. An executable program may be stored in any portion or component of the memory 606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 606 is defined herein as both volatile and nonvolatile memory and data storage components. Volatile components are those that do not retain data values upon loss of power. Nonvolatile components are those that retain data upon a loss of power. Thus, the memory 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

In addition, the processor 603 may represent multiple processors and the memory 606 may represent multiple memories that operate in parallel. In such a case, the local interface 609 may be an appropriate network that facilitates communication between any two of the multiple processors, between any processor and any one of the memories, or between any two of the memories etc. The local interface 609 may comprise additional systems designed to coordinate this communication, including, for example, performing load balancing. The processor 603 may be of electrical or of some other available construction.

Although various systems and applications such as the notification library 133 and/or other systems and applications mentioned above may be depicted as being embodied in software or code executed by general purpose hardware such as processor-based systems as discussed above, as an alternative the same may also be embodied in dedicated hardware or a combination of software/general purpose hardware and dedicated hardware. If embodied in dedicated hardware, such systems and applications can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc.

The flowchart of FIG. 5 shows the architecture, functionality, and operation of an implementation of the notification library 133. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flowchart of FIG. 5 shows a specific order of execution, it is understood that the order of execution may differ from that which is depicted. For example, the order of execution of two or more blocks may be scrambled relative to the order shown. Also, two or more blocks shown in succession in FIG. 5 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, where various systems and applications described herein such as the notification library 133 and/or other systems and applications comprise software or code, each can be embodied in any computer-readable medium for use by or in connection with an instruction execution system such as, for example, a processor in a computer system or other system. In this sense, such systems or applications may comprise, for example, statements including instructions and declarations that can be fetched from the computer-readable medium and executed by the instruction execution system. In the context of the present disclosure, a "computer-readable medium" can be any medium that can contain, store, or maintain the above-described systems and applications for use by or in connection with the instruction execution system. The computer readable medium can comprise any one of many physical media such as, for example, electronic, magnetic, optical, or semiconductor media. More specific examples of a suitable computer-readable medium would include, but are not limited to, magnetic tapes, magnetic floppy diskettes, magnetic hard drives, memory cards, solid-state drives, Universal Serial Bus (USB) flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A computer-implemented method, comprising:
    obtaining, by a mobile device, a notification data item associated with at least one application executed by the mobile device;
    determining, by the mobile device, a location associated with the mobile device;
    determining, by the mobile device, whether the location is associated with one of an escalated notification level or a de-escalated notification level by identifying a location listing associated with the location, identifying a location type associated with the location listing, and determining whether the location type is associated with a notification rule, the notification rule specifying one of the escalated notification level or the de-escalated notification level based upon the location type;
    extracting, by the mobile device, notification content from the notification data item; and
    generating, by the mobile device, a device notification corresponding to the at least one of the escalated notification level or the de-escalated notification level.

2. The computer-implemented method of claim 1, wherein generating the device notification further comprises generating at least one of: a notification user interface element rendered on a display device associated with the mobile device, an audible notification via a speaker associated with the mobile device, activation of a vibration motor associated with the mobile device, modifying a brightness level of the display device, or a visual notification via at least one externally visible light emitting diode (LED) associated with the mobile device.

3. The computer-implemented method of claim 1, wherein generating the device notification according to the de-escalated notification level further comprises delaying the device notification until an updated location of the mobile device is a specified distance away from a current location corresponding to the location.

4. The computer-implemented method of claim 1, wherein:
    the escalated notification level comprises an escalated volume level relative to a baseline volume level; and
    the de-escalated notification level comprises a lower volume level relative to the baseline volume level.

5. The computer-implemented method of claim 1, further comprising selecting, by the mobile device, the de-escalated notification level in response to a determination that a calendar accessible to the mobile device indicates an appointment at a current time.

6. The computer-implemented method of claim 1, further comprising:
    identifying, by the mobile device, a current event listing associated with the location listing;
    determining, by the mobile device, whether an event is currently occurring at the location; and
    selecting, by the mobile device, the one of the escalated notification level or the de-escalated notification level based upon whether the event is currently occurring at the location.

7. A non-transitory computer-readable medium embodying a program executable in a mobile device, the program, when executed, causing the mobile device to at least:
    obtain a notification data item associated with at least one application executed by the mobile device;
    determine a location associated with the mobile device;
    extract notification content from the notification data item;
    identify at least one notification rule associated with the location by identifying a location listing associated with the location, identifying a location type associated with the location listing, and determining whether the location type is associated with the at least one notification rule, the at least one notification rule specifying one of one of an escalated notification level or a de-escalated notification level based upon the location type; and
    generate a device notification in the mobile device corresponding to a notification level specified by the at least one notification rule.

8. The non-transitory computer-readable medium of claim 7, wherein the program causes the mobile device to identify at least one notification rule associated with the location is identified by:
    identifying, from metadata associated with the location, operating hours associated with the location listing; and
    determining whether the at least one notification rule is associated with whether the location is open or closed.

9. The non-transitory computer-readable medium of claim 7, wherein the program causes the mobile device to identify at least one notification rule associated with the location by:
- determining whether the location is associated with a first user linked to a second user associated with the mobile device; and
- identifying, by the mobile device, a notification rule associated with the first user.

10. The non-transitory computer-readable medium of claim 9, wherein the program causes the mobile device to determine whether the location is associated with the first user linked to the second user associated with the mobile device by determining whether the location is within a predetermined radius of an address associated with the first user in an address book accessible to the mobile device.

11. The non-transitory computer-readable medium of claim 9, wherein the notification rule specifies the notification level based at least in part upon a relationship between the first user and the second user.

12. A system, comprising:
- an electronic data store configured to store at least specific computer-executable instructions; and
- a mobile device comprising a hardware processor and in communication with the electronic data store, the mobile device configured to execute the specific computer-executable instructions to at least:
  - obtain a notification request from an application executed in the mobile device to generate a device notification in the mobile device;
  - identify location data associated with the mobile device;
  - identify a notification level based at least in part upon the location data by identifying a location listing associated with the location data, identifying a location type associated with the location listing, and determining whether the location type is associated with a notification rule, the notification rule specifying one of one of an escalated notification level or a de-escalated notification level based upon the location type;
  - identify the notification level based at least in part on the location data; and
  - generate the device notification according to the notification level.

13. The system of claim 12, wherein the notification level is identified based at least in part upon the location data by determining a velocity of the mobile device associated with the location data and selecting the notification level based at least in part upon the velocity of the mobile device.

14. The system of claim 13, wherein a particular specified notification level is selected when the velocity meets a predefined threshold.

15. The system of claim 12, wherein the notification level is identified based at least in part upon the location type by:
- selecting an escalated notification level when the location type is associated with an escalated volume level relative to a baseline volume level; and
- selecting a de-escalated notification level when the location type is associated with a lowered volume level relative to the baseline volume level.

16. The system of claim 12, wherein the device notification is generated according to the notification level by initiating a combination of at least one of: display of a notification user interface element on a display associated with the mobile device, initiating playing of a ringtone, activating a light emitting diode (LED) associated with the mobile device, modifying a brightness level of the display associated with the mobile device, or activating a vibration motor associated with the mobile device.

17. The system of claim 16, wherein the notification level specifies at least one of a repeat frequency, a repeat pattern, or an intensity associated with the device notification.

* * * * *